(12) United States Patent
Shrader

(10) Patent No.: US 8,344,854 B2
(45) Date of Patent: Jan. 1, 2013

(54) TRANSIENT ROUTING SLIPS AND INTER-OFFICE ENVELOPES

(75) Inventor: Eric J. Shrader, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 656 days.

(21) Appl. No.: 12/393,915

(22) Filed: Feb. 26, 2009

(65) Prior Publication Data

US 2010/0214064 A1    Aug. 26, 2010

(51) Int. Cl.
*H04Q 5/22* (2006.01)

(52) U.S. Cl. ........... 340/10.1; 340/572.1; 340/572.4; 340/539.13; 283/31; 358/448; 358/3.28; 358/1.15

(58) Field of Classification Search ........... 340/10.1, 340/825.49, 568.1, 572.1, 10.2, 10.12, 5.49, 340/539.13, 572.4; 358/3.28; 705/345, 333; 283/81, 448, 3.28, 1.15

See application file for complete search history.

(56) References Cited

U.S. PATENT DOCUMENTS

| | | | |
|---|---|---|---|
| 7,166,420 B2 | 1/2007 | Chopra et al. | |
| 7,202,006 B2 | 4/2007 | Chopra et al. | |
| 7,205,088 B2 | 4/2007 | Iftime et al. | |
| 7,214,456 B2 | 5/2007 | Iftime et al. | |
| 7,229,740 B2 | 6/2007 | Iftime et al. | |
| 7,300,727 B2 | 11/2007 | Kazmaier et al. | |
| 7,316,875 B2 | 1/2008 | Iftime et al. | |
| 7,381,506 B2 | 6/2008 | Iftime et al. | |
| 7,432,027 B2 | 10/2008 | Chopra et al. | |
| 2002/0041234 A1* | 4/2002 | Kuzma et al. | 340/572.8 |
| 2002/0180588 A1* | 12/2002 | Erickson et al. | 340/10.2 |
| 2004/0008114 A1* | 1/2004 | Sawyer | 340/572.1 |
| 2004/0119605 A1* | 6/2004 | Schaper | 340/825.49 |
| 2004/0141200 A1* | 7/2004 | Minami et al. | 358/1.15 |
| 2006/0139172 A1* | 6/2006 | Waldner et al. | 340/572.7 |
| 2006/0254815 A1* | 11/2006 | Humphrey et al. | 174/380 |
| 2007/0140775 A1* | 6/2007 | Shrader | 401/195 |
| 2008/0186186 A1* | 8/2008 | Campbell | 340/572.8 |
| 2008/0191136 A1 | 8/2008 | Shrader et al. | |
| 2009/0085750 A1* | 4/2009 | Waldner et al. | 340/572.7 |
| 2009/0167502 A1* | 7/2009 | Erickson et al. | 340/10.3 |
| 2009/0295851 A1* | 12/2009 | Edwards et al. | 347/9 |
| 2010/0012018 A1* | 1/2010 | Ribi | 116/207 |
| 2010/0233597 A1* | 9/2010 | Roof | 430/19 |
| 2010/0259779 A1* | 10/2010 | Bellotti et al. | 358/1.15 |
| 2010/0321740 A1* | 12/2010 | Roof | 358/448 |

\* cited by examiner

*Primary Examiner* — Hoi Lau

(74) *Attorney, Agent, or Firm* — Marger Johnson & McCollom, P.C.

(57) ABSTRACT

An inter-office communication management system can include an inter-office communication item such as an inter-office mail envelope or routing slip. The inter-office communication item can be a transient document. An inter-office communication identifier placement module can affix an inter-office communication identifier to the first inter-office communication label. The inter-office communication label can be attached to the inter-office communication item. An inter-office communication tracking module can be used to track the inter-office communication item based on the inter-office communication identifier affixed to the inter-office communication label.

16 Claims, 4 Drawing Sheets

TRANSIENT ROUTING SLIPS AND INTER-OFFICE ENVELOPES

TECHNICAL FIELD

The disclosed technology relates to the field of transient documents and, more particularly, to various techniques pertaining to using transient documents in connection with certain inter-office communications such as routing slips and inter-office envelopes.

BACKGROUND

As used herein, transient document media is media that is suitable for use with transient printing technology, such as reusable paper. Thus, a transient document is a document that consists of transient document media. One type of transient document is a special type of reusable paper that is treated with a chemical capable of changing color when exposed to a light source or to a heat source. Such exposure of the transient ink to the source results in the creation of an image (e.g., text and/or graphics) that can last for a certain period of time (e.g., one or two days) before fading away and ultimately disappearing. Alternatively, a user can proactively erase at least a portion of the image on the transient document by exposing the transient document to a particular source such as a light source or a heat source.

With the emergence of transient documents, the same physical document can be used repeatedly over the course of multiple cycles of user interaction. By allowing a user to use the same physical document over and over again, a transient document based system enables the user to effectively reduce the amount of paper that would otherwise be used to print multiple copies of a document such as successive revisions thereof.

The use of transient documents is particularly effective for printed documents that need only be available for a limited time. For example, a user can print a non-final draft of a legal brief using a transient document. The user can subsequently print each successive revision of the draft on the same transient document before achieving the final draft. Once the final draft is completed, the user can print a copy of the final draft in a more permanent manner using regular ink on traditional paper, for example.

The use of transient documents for printing legal documents can provide an additional benefit in that such use prevents virtually any revision of each legal document printed using a transient document from being discoverable. This is because the text of each version of the document that is printed on the transient document would disappear at a certain point, such as after a certain amount of time has passed or after the transient ink has been proactively erased by exposure to a light source or to a heat source, for example. The real estate and mortgage industries are other industries that can greatly benefit from the use of transient documents, as those particular industries often use a large amount of paper for multiple revisions of various types of documents.

However, there remains a need for the use of transient documents in connection with inter-office communications such as routing slips and inter-office envelopes.

DETAILED DESCRIPTION

Despite a variety of efforts that companies often pursue in an attempt to transition to a digital, paperless office, there remain many situations in which inter-office communications such as inter-office mail and routing slips, for example, continue to be required. Traveling documents also continue to be used in many different manufacturing processes, such as in connection with the tracking of goods and options, for example. While these and other kinds of envelopes can be and are often re-used, and the routing slips can be and often are recycled, there are presently no inter-office communication management systems that use transient document printing for inter-office communications.

Transient document media such as reusable paper can provide a low cost, environmentally friendly alternative for a company's inter-office communication management system. The use of transient documents in place of traditional paper documents can also enable a company to achieve significant cost savings. Such use can also enable better communication with a hybrid computer/human readable tracking system. In addition, the use of transient documents can also significantly and positively affect the company's environmental impact by reducing the amount of paper waste.

Embodiments of the disclosed technology can include the use of an inter-office communication such as an inter-office mail envelope, a routing slip, or the like. An inter-office communication label can be attached to the inter-office communication itself. The label can be used for tracking purposes. For example, each time a desired delivery of the inter-office communication is made, a user can make note of the delivery by marking the label. In certain embodiments, the user can use a transient ink pen to mark the label.

In certain embodiments, the system can include the printing of labels for inter-office communications using transient document media. For example, the system can print the labels on reusable paper. These labels can thus be affixed to an inter-office mail envelope or a courier pouch, or as a separate routing slip that can be attached to the inter-office communication. The label can be printed using a transient document printer such as an ultraviolet (UV) printer or using a hand-held wand-type printer. The system can enable the printing of a one-line or multiple line address, for example.

Figure 1:
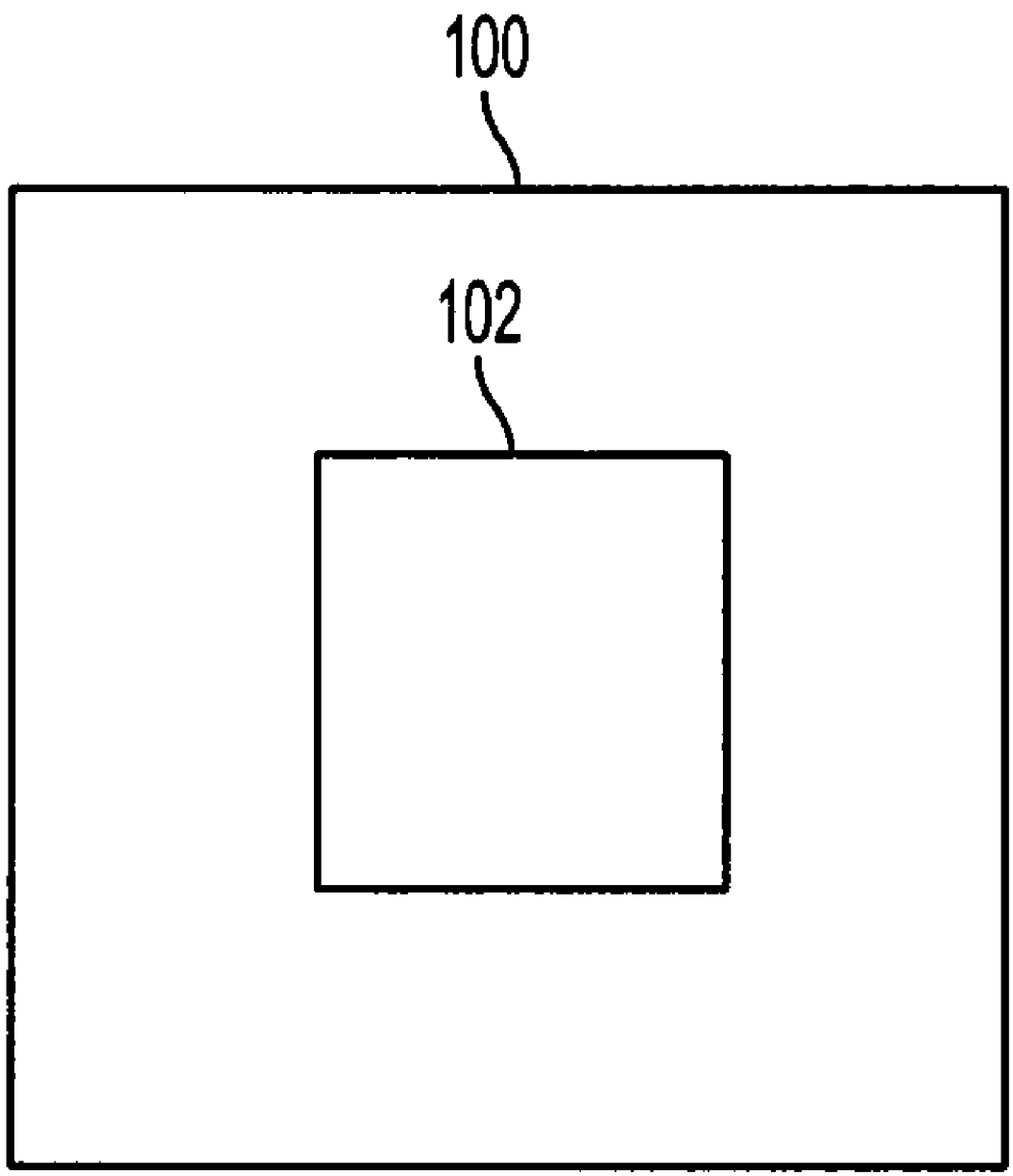
FIG. 1 illustrates an example of an inter-office communication to which an inter-office communication label is attached.

FIG. 1 illustrates an example of an inter-office communication 100 that has an inter-office communication label 102 attached thereto. The inter-office communication 100 can include an inter-office communication, such as an envelope, or a routing slip. The inter-office communication 100 can consist of reusable paper.

The inter-office communication label 102 can include a transient document having information printed thereon. The information can be partially or completely of a transient nature (e.g., printed using transient ink). The inter-office communication label 102 can also include a marking that can identify the inter-office communication to which the inter-office communication label 102 is attached.

Figure 2:
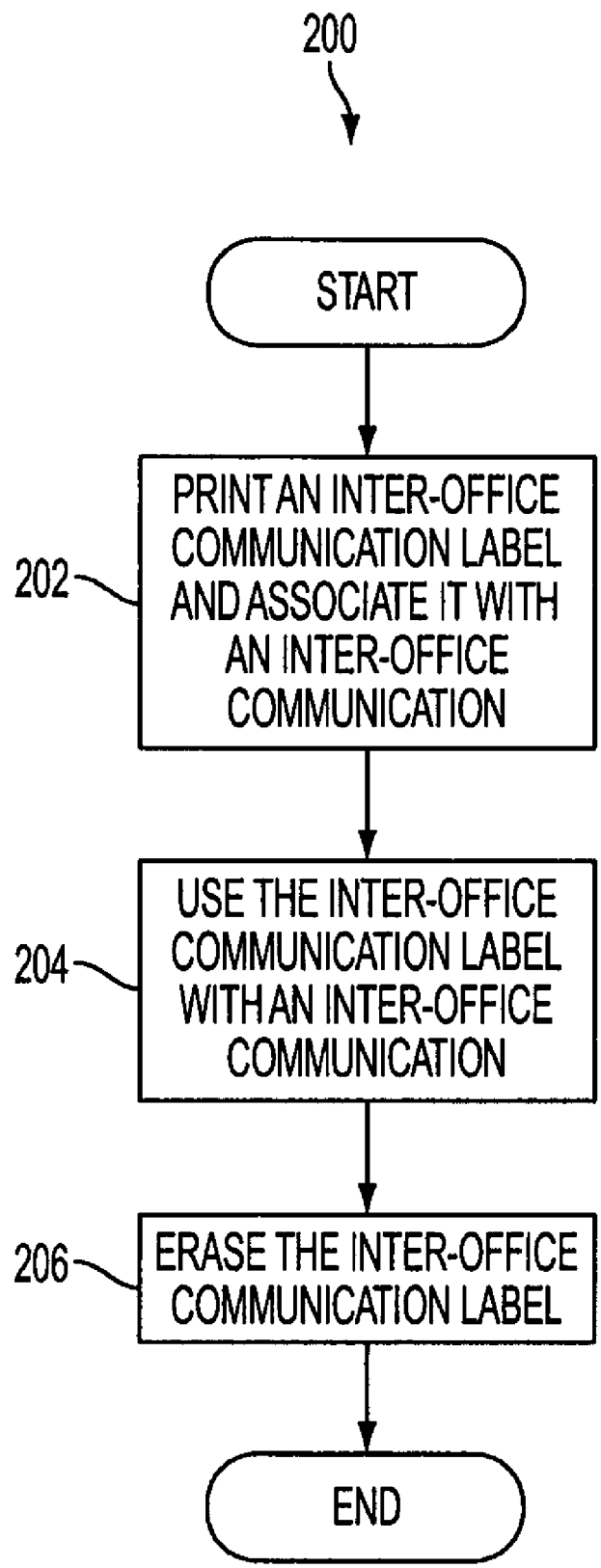
FIG. 2 illustrates a first example of a method using transient documents in accordance with embodiments of the disclosed technology.

FIG. 2 illustrates a first example of a method 200 employing the use of transient documents in accordance with embodiments of the disclosed technology. At 202, an inter-office communication label is printed and associated with (e.g., affixed to) an inter-office communication. The label can include a transient document, such as reusable paper. The information printed on the label can include information pertaining to the point of origin and/or point of destination for the inter-office communication. The printed information can also include a signature section to be used by a user when confirming that the inter-office communication has been successfully delivered and/or received, for example. Some or all of the information printed on the label can be printed using transient printing techniques.

At 204, the inter-office communication label can be used by a user or machine. For example, a user can sign or otherwise write on the label information pertaining to the delivery of the inter-office communication to which the label is attached. Alternatively, a machine can be used. For example, once the inter-office communication has reached its destination, the inter-office communication label can be marked by a printing device such as a printer, for example. The inter-office communication label can also be scanned by a scanning device such as a document scanner.

At 206, the inter-office communication label can be erased. For example, the inter-office communication label can be proactively erased by exposing it to a light source or to a heat source. Alternatively, the inter-office communication label can be allowed to fade away naturally until it is no longer readable. At this point, the label can also be removed from the inter-office communication. The label can be placed on a different inter-office communication if the original inter-office communication has become too worn, for example, or the label can be discarded if it has become too worn itself.

Once the inter-office communication label is erased, the inter-office communication label can be re-used. Alternatively, the inter-office communication to which the inter-office communication label is attached can be re-used before or as the transient printing fades. For example, a timestamp can be part of the information printed on the inter-office communication label so that a user can readily identify which marking on the label is the most recent and, therefore, is the information to which he or she should direct his or her attention.

The printing on the inter-office communication label can be done using only transient ink for scenarios in which the label will not be needed for more than a relatively brief period of time, for example. In some situations, however, certain information such as the company name or brand may be needed on the inter-office communication for an extended period of time. In these situations, the pertinent information can be printed using traditional, permanent ink and the remainder of the information can be printed using transient printing techniques.

In alternative embodiments, the system can enable the use of a UV lamp and stencil such that a user can "stamp" the inter-office communication with pertinent information. For example, a company may have certain destinations that are frequently used for inter-office communications. The use of a "stamp" instead of a printing device can increase the efficiency of the inter-office communication throughput.

In certain embodiments, the use of transient printing can be used for inter-office communications that need to traverse a complex route. For example, the signoff process for a particular report can include the printing of some or all of the destinations to which the report is to travel. As the report reaches each destination, a user can indicate that the report has reached the corresponding destination by erasing the destination specific information on the report before passing on the report to the next destination.

Figure 3:
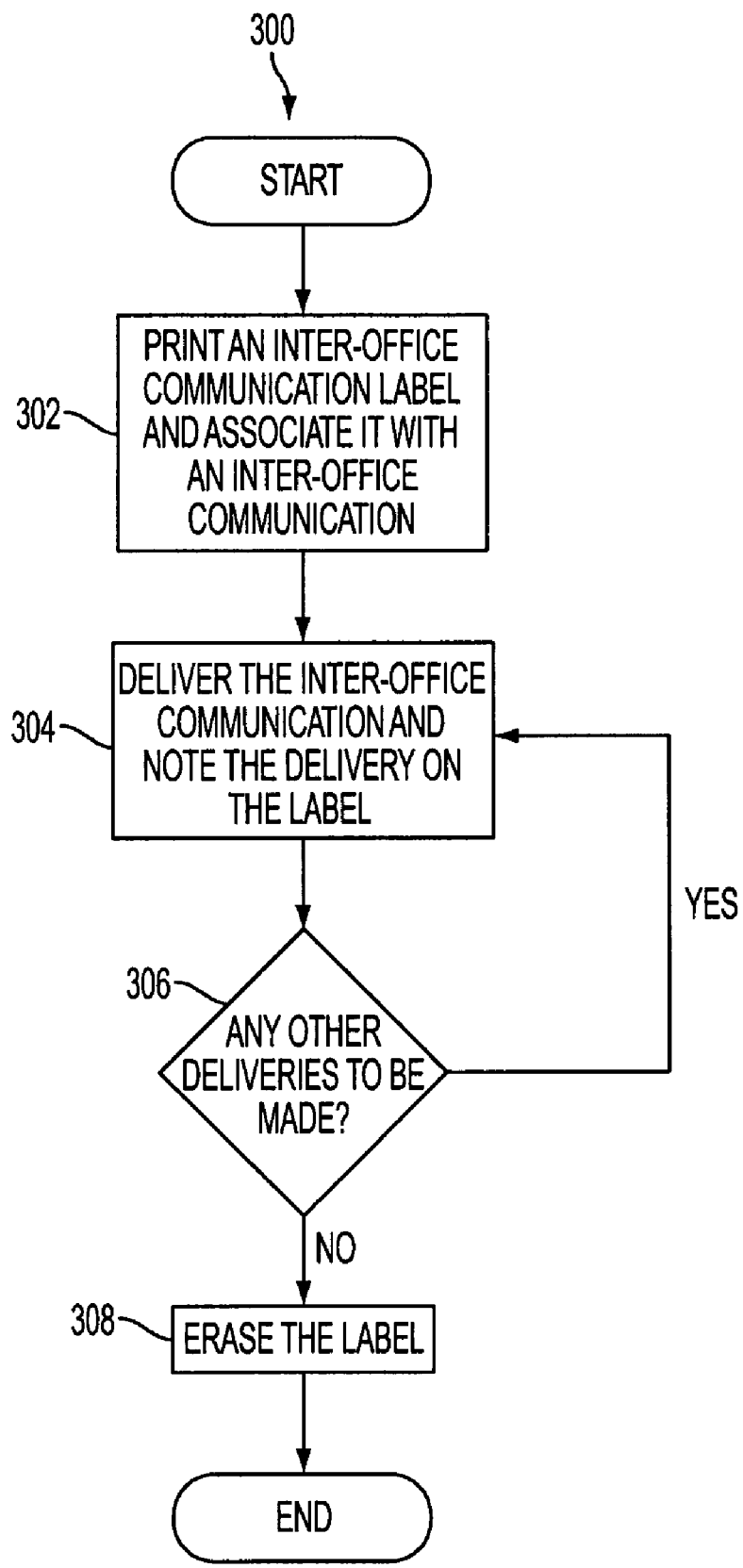
FIG. 3 illustrates a second example of a method using transient documents in accordance with embodiments of the disclosed technology.

FIG. 3 illustrates a second example of a method 300 employing the use of transient documents in accordance with embodiments of the disclosed technology. At 302, an inter-office communication label is printed. This step is similar to step 202 of FIG. 2 and can be done using virtually any of the printing techniques described herein. In the example, the information printed on the label includes information about each of several different stops that the inter-office communication is to make.

At 304, the inter-office communication is delivered to the first stop and information pertaining to the delivery is noted on the inter-office communication label. For example, the user that accepts delivery of the inter-office communication can sign his or her name on the label as well as any other pertinent information, such as date and/or time of the delivery.

At 306, a determination is made as to whether the inter-office communication is to be delivered anywhere else. If so, the process returns to 304 and the inter-office communication is delivered to the next stop. If not, the process advances to 308.

At 308, the inter-office communication label is erased. This step is similar to step 206 of FIG. 2. The inter-office communication label can be erased using any of the techniques described herein. Alternatively, the inter-office communication label can be re-used without erasing the information printed thereon.

In certain embodiments, the use of a transient document as an inter-office communication can be combined with a marking such as a permanent glyph or other optical code that is either human or machine readable in order to provide the system with the ability to track the transient document in the inter-office mail, in courier-based delivery systems, and in other document or item tracking. Such tracking can be particularly beneficial when used in manufacturing processes or assembly lines because it can enable the system to track any number of goods through the manufacturing process. For example, the tracking can be used to keep track of required options that need to be installed in human-readable form. As the required options are completed, a user or machine can mark the inter-office communication label using a transient ink pen, for example, to indicate the completion. Certain test results such as quality assurance checks can also be recorded using the inter-office communication label.

In certain embodiments, a radio frequency identification (RFID) tag can be used in place of or in addition to a permanent glyph or other optical code on the inter-office communication label for purposes such as tracking of the inter-office communication. This can increase the efficiency and accuracy of hybrid mail systems in which some of the sorting is done automatically and some of the sorting is done manually. In these embodiments, the permanent optical or RFID tag can provide tracking information as a key into a system database at virtually any location where an RFID tag reader is available.

An RFID tag can also provide tracking information that the system can use to cross-check that the corresponding inter-office communication followed the correct routes. The transient printing can also be used where readers from the system are not available. These hybrid systems are especially valuable during the transition to an all electronic tracking system and to provide redundancy for situations where the system is down.

Figure 4:
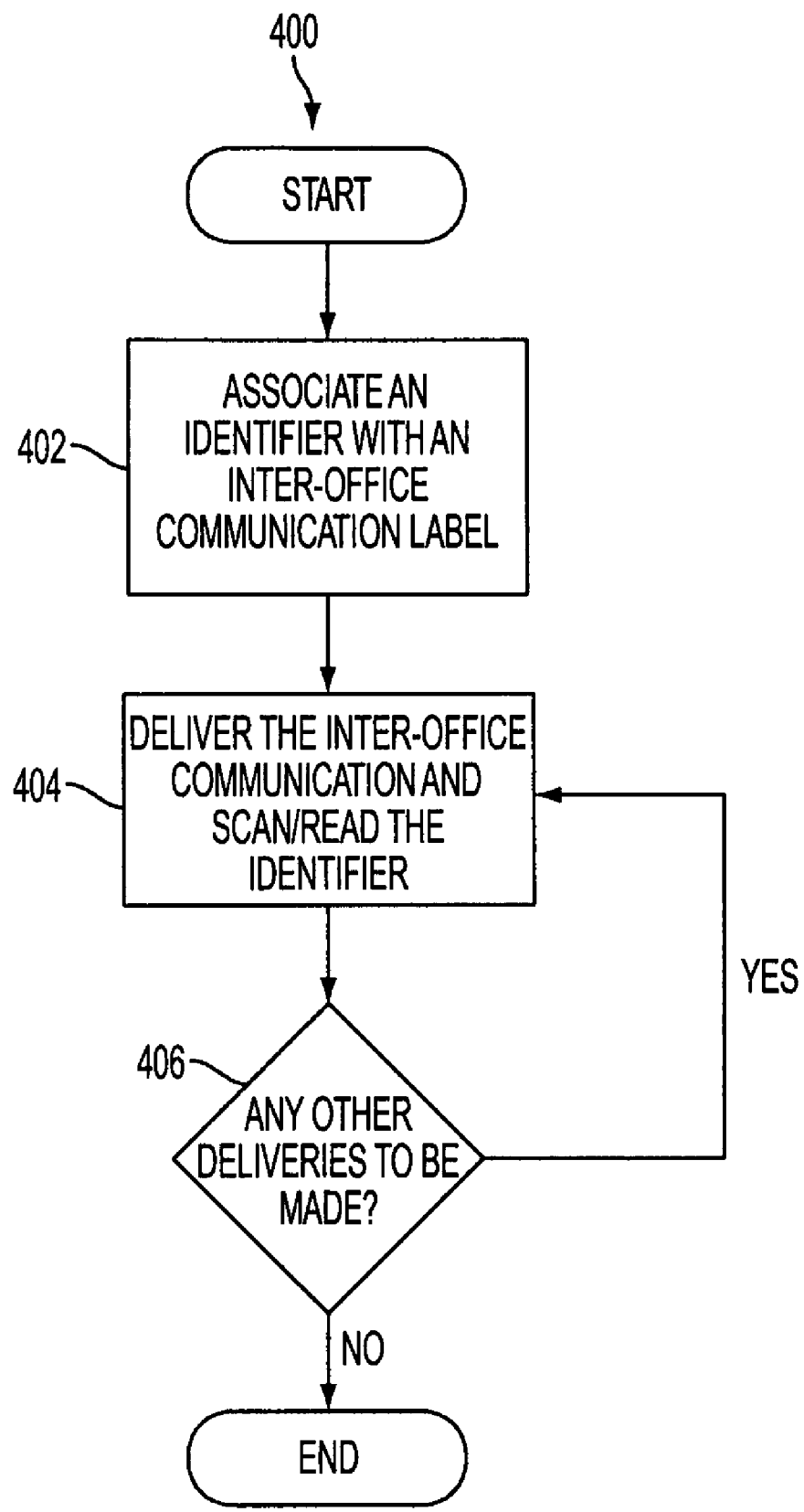
FIG. 4 illustrates a third example of a method using transient documents in accordance with embodiments of the disclosed technology.

FIG. 4 illustrates a third example of a method 400 using transient documents in accordance with embodiments of the disclosed technology. At 402, an identifier is affixed to (e.g., printed on) an inter-office communication label. For example, the identifier can include a permanent glyph or other optical code that is printed directly on the label using transient ink, permanent ink, or a combination thereof. Alternatively (or in addition to the glyph or other optical code), the identifier can include an RFID tag that can be attached to the label.

At 404, the inter-office communication is delivered to a first location. At the first location, a record is made pertaining to the delivery using the identifier. For example, if the identifier includes a glyph or other optical code, an optical code reader can be used to read the glyph or code. If the identifier includes an RFID tag, an RFID reader can read the tag. Once the identifier has been noted, a record can be created or updated in the system database. The record can include information such as when and where the delivery was made and who signed for the delivery.

At 406, a determination is made as to whether the inter-office communication is to be delivered to any other location such as a different department. If so, the process can return to 404 as the inter-office communication is delivered to the next location. If not, the process can stop. At this point, the inter-office communication label, including the identifier, can be re-used. Alternatively, if the identifier is easily removable from the label (such as an RFID tag, for example), the identifier can be removed and subsequently used in connection with a different label.

The following discussion is intended to provide a brief, general description of a suitable machine in which certain embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An inter-office communication management system, comprising:
   a first inter-office communication label affixed to a first inter-office communication item, wherein the first inter-office communication label comprises transient document media;
   an inter-office communication identifier placement module operable to print a first inter-office communication identifier on the first inter-office communication label;
   a radio frequency identification (RFID) tag affixed to the first inter-office communication label; and
   an inter-office communication tracking module operable to track the first inter-office communication item based at least in part on the first inter-office communication identifier and the RFID tag before the first inter-office communication identifier is erased,
   wherein the inter-office communication identifier placement module is further operable to print a second inter-office communication identifier on the first inter-office communication label after the first inter-office communication identifier is erased.

2. The inter-office communication management system of claim 1, wherein the inter-office communication identifier placement module is operable to print the first inter-office communication identifier on the first inter-office communication label using at least one of transient ink and permanent ink.

3. The inter-office communication management system of claim 1, further comprising a second inter-office communication label affixed to a second inter-office communication item, wherein the second inter-office communication label comprises transient document media, and wherein the inter-office communication identifier placement module is further operable to print a second inter-office communication identifier on the second inter-office communication label.

4. The inter-office communication management system of claim 3, wherein the inter-office communication tracking module is further operable to track the second inter-office communication item based at least in part on the second inter-office communication identifier.

5. The inter-office communication management system of claim 1, wherein the first inter-office communication item comprises transient document media.

6. The inter-office communication management system of claim 1, wherein the first inter-office communication item comprises an inter-office mail envelope.

7. The inter-office communication management system of claim 1, wherein the inter-office communication tracking module further comprises an RFID reader configured to read the RFID tag.

8. A computer-implemented method of managing inter-office communications, comprising:
   attaching an inter-office communication label to an inter-office communication, the inter-office communication label having an inter-office communication identifier printed thereon, wherein the inter-office communication label comprises transient document media;
   affixing an RFID tag to the inter-office communication label; and
   tracking the inter-office communication based at least in part on the inter-office communication identifier and the RFID tag before the inter-office communication identifier is erased,
   wherein the inter-office communication label has a subsequent inter-office communication identifier printed thereon after the inter-office communication identifier is erased.

9. The computer-implemented method of claim 8, wherein the inter-office communication label is permanently attached to the inter-office communication.

10. The computer-implemented method of claim 8, further comprising printing information on the inter-office communication label using permanent ink, wherein the information comprises delivery information pertaining to at least one mail stop.

11. The computer-implemented method of claim 8, wherein the inter-office communication identifier comprises an optical code, and wherein tracking the inter-office communication comprises reading the optical code using an optical reader.

12. The computer-implemented method of claim 8, further comprising reading the RFID tag using an RFID reader.

13. The computer-implemented method of claim 8, further comprising creating in a database a record corresponding to the inter-office communication item.

14. The computer-implemented method of claim 13, further comprising updating the record responsive to a scan of the inter-office communication label.

15. The computer-implemented method of claim 8, further comprising erasing the inter-office communication identifier.

16. One or more tangible computer-readable media storing thereon machine-executable instructions that, when executed by a processor, perform the computer-implemented method of claim 8.

\* \* \* \* \*